ns)

(12) United States Patent
Kannan et al.

(10) Patent No.: US 10,936,637 B2
(45) Date of Patent: Mar. 2, 2021

(54) ASSOCIATING INSIGHTS WITH DATA

(71) Applicant: HEWLETT PACKARD ENTERPRISE DEVELOPMENT LP, Houston, TX (US)

(72) Inventors: Kalapriya Kannan, Bangalore (IN); Suparna Bhattacharya, Bangalore (IN); Douglas L. Voigt, Boise, ID (US); Muthukumar Murugan, Boulder, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 667 days.

(21) Appl. No.: 15/483,498

(22) Filed: Apr. 10, 2017

(65) Prior Publication Data

US 2017/0300561 A1    Oct. 19, 2017

(30) Foreign Application Priority Data

Apr. 14, 2016 (IN) .............................. 201641013159

(51) Int. Cl.
*G06F 16/33* (2019.01)

(52) U.S. Cl.
CPC ................................ *G06F 16/3344* (2019.01)

(58) Field of Classification Search
CPC .................................................. G06F 16/3344
See application file for complete search history.

(56) References Cited

U.S. PATENT DOCUMENTS

| 7,243,099 | B2  | 7/2007  | Lokken |
| 7,996,253 | B2  | 8/2011  | Reed et al. |
| 8,898,200 | B2  | 11/2014 | Shridhar et al. |
| 9,418,336 | B2* | 8/2016  | Peev ................... G06K 9/00496 |
| 9,529,864 | B2* | 12/2016 | Sundelin ........... G06F 16/24575 |
| 10,067,987 | B1* | 9/2018  | Khanna ..................... G06F 16/44 |
| 10,296,501 | B1* | 5/2019  | Todd ................... G06F 16/2365 |
| 10,303,771 | B1* | 5/2019  | Jezewski ................. G06F 16/30 |

(Continued)

FOREIGN PATENT DOCUMENTS

| WO | WO-2004055616 A2 | 7/2004 |
| WO | WO-2014146685 A1 | 9/2014 |
| WO | WO-2015113301 A1 | 8/2015 |
| WO | WO-2015138789 A1 | 9/2015 |

OTHER PUBLICATIONS

Cloudera, Inc., "Data Helps Solve the World's Biggest Problems," (Web Page), Apr. 2, 2016, 4 pages, available at http://www.cloudera.com/.

(Continued)

*Primary Examiner* — Robert W Beausoliel, Jr.
*Assistant Examiner* — Susan F Rayyan
(74) *Attorney, Agent, or Firm* — Hewlett Packard Enterprise Patent Department

(57) ABSTRACT

Some examples relate to associating an insight with data. In an example, data may be received. A determination may be made that data type of the data is same as compared to an earlier data. An insight generated from the earlier data may be identified, wherein the insight may represent intermediate or resultant data generated upon processing of the earlier data by an analytics function, and wherein during generation metadata is associated with the insight. An analytics function used for generating the insight may be identified.

14 Claims, 15 Drawing Sheets

(56) References Cited

U.S. PATENT DOCUMENTS

| | | | |
|---|---|---|---|
| 10,320,633 B1* | 6/2019 | Wong | H04L 67/22 |
| 2006/0085255 A1 | 4/2006 | Hastings et al. | |
| 2007/0061190 A1 | 3/2007 | Wardell | |
| 2012/0173747 A1* | 7/2012 | Roesch | G06Q 10/063 709/231 |
| 2014/0032264 A1 | 1/2014 | Kalikivayi et al. | |
| 2014/0164607 A1* | 6/2014 | Bai | H04L 41/14 709/224 |
| 2014/0199666 A1 | 7/2014 | Osetinsky | |
| 2015/0033227 A1 | 1/2015 | Lin et al. | |
| 2015/0134704 A1 | 5/2015 | Wallis | |
| 2015/0186819 A1* | 7/2015 | Patel | G06Q 10/0637 705/7.37 |
| 2015/0310015 A1 | 10/2015 | Alexander et al. | |
| 2015/0339376 A1* | 11/2015 | Wieweg | G06F 16/3344 707/739 |
| 2015/0356094 A1* | 12/2015 | Gorelik | G06F 16/211 707/748 |
| 2015/0356123 A1* | 12/2015 | Gorelik | G06F 16/2465 715/765 |
| 2015/0356405 A1 | 12/2015 | Sanchez et al. | |
| 2015/0356626 A1 | 12/2015 | Chawla et al. | |
| 2016/0019267 A1* | 1/2016 | Kala | G06F 16/2465 707/754 |
| 2016/0021198 A1 | 1/2016 | Liu et al. | |
| 2016/0162588 A1* | 6/2016 | Tuchman | G06F 16/3344 707/722 |
| 2016/0203217 A1* | 7/2016 | Anisingaraju | G06Q 10/067 707/738 |
| 2016/0253340 A1* | 9/2016 | Barth | G06F 16/148 707/756 |
| 2016/0292157 A1* | 10/2016 | Zhang | G06F 16/3344 |
| 2016/0371588 A1* | 12/2016 | Richardson | G06N 5/022 |
| 2017/0249389 A1* | 8/2017 | Brovinsky | G06Q 30/02 |
| 2018/0158159 A1* | 6/2018 | Divine | G06Q 50/184 |
| 2018/0257276 A1* | 9/2018 | Hipwood | B29C 45/14786 |

OTHER PUBLICATIONS

Microsoft, "Microsoft Analytics Platform System," (Web Page), Apr. 2, 2016, 6 pages, http://www.microsoft.com/en-in/servercloud/products/analyticsplatformsystem/.

Podium Data, "Podium: The Solution for Common Challenges," (Research Paper), Feb. 8, 2016, 6 pages, <http://www.podiumdata.com/solutions/>.

Teradata, "Teradata's Portfolio for Hadoop: Simplifying Powerful Big Data Analytics for Today's Enterprise," (Web Page), Apr. 2, 2016, 5 pages, http://www.teradata.com/products-and-services/hadoopoverview/.

Chen, Y. et al., "Toward Effective Insight Management in Visual Analytics Systems," (Research Paper), Apr. 20-23, 2009, IEEE, 8 pages.

Cloudera, Inc., "Data Helps Solve the World's Biggest Problems," (Web Page), 2016, 4 pages, available at http://www.cloudera.com/.

Cohesity, "Fragmentation Results in Data Sprawl and Lack of Visibility into Enterprise Data," (Research Paper), 2015, 2 pages.

Google Analytics, "Google Analytics Platform," (Web Page), Jan. 28, 2016, 4 pages, available at https://developers.google.com/analytics/?hl=en.

Hortonworks Inc., "Next Generation Open and Connected Data Platforms," (Web Page), retrieved on Apr. 2, 2016, 4 pages, available at http://hortonworks.com/.

K, Raghuraman et al., "Adding Intelligence to Health & Safety," (Research Paper), Wipro Ltd., Oct. 8, 2013, 13 pages.

Li, H. et al., "Tachyon: Reliable, Memory Speed Storage for Cluster Computing Frameworks," (Research Paper), ACM, 2014, 15 pages.

MAPR Technologies, Inc., "Drive Your Data With One Converged Platform," (Web Page), Mar. 29, 2016, 3 pages, available at https://www.mapr.com/.

Microsoft, "Microsoft Analytics Platform System," (Web Page), 2016, 6 pages, available at http://www.microsoft.com/en-in/servercloud/products/analyticsplatformsystem/.

Oracle, "An Enterprise Architect's Guide to Big Data," (Research Paper), Reference Architecture Overview, May 2015, 58 pages.

Podium Data, "Podium: The Solution for Common Challenges," (Research Paper), 2016, 6 pages.

Spark, "Spark Programming Guide—Spark 1.6.1 Documentation," (Web Page), retrieved on Apr. 2, 2016, 17 pages, available at http://spark.apache.org/docs/latest/programmingguide.html.

Teradata, "Teradata's Portfolio for Hadoop: Simplifying Powerful Big Data Analytics for Today's Enterprise," (Web Page), 2016, 5 pages, available at https://hadoop.apache.org/.

Zaharia, M. et al., "Resilient Distributed Datasets: A Fault-tolerant Abstraction for In-memory Cluster Computing," (Research Paper), USENIX, 2012, 14 pages.

Apache Hadoop, "Apache Hadoop", Mar. 28, 2016, 8 pages.

\* cited by examiner

ASSOCIATING INSIGHTS WITH DATA

BACKGROUND

Big data is a term used to describe a large volume of data—structured, semi-structured, and unstructured—that may be mined for information. Big data may be characterized using 3Vs: volume (amount of data), velocity (speed of data in and out), and variety (range of data types and sources).

BRIEF DESCRIPTION OF THE DRAWINGS

For a better understanding of the solution, example will now be described, purely by way of example, with reference to the accompanying drawings, in which.

DETAILED DESCRIPTION

Figure 1:
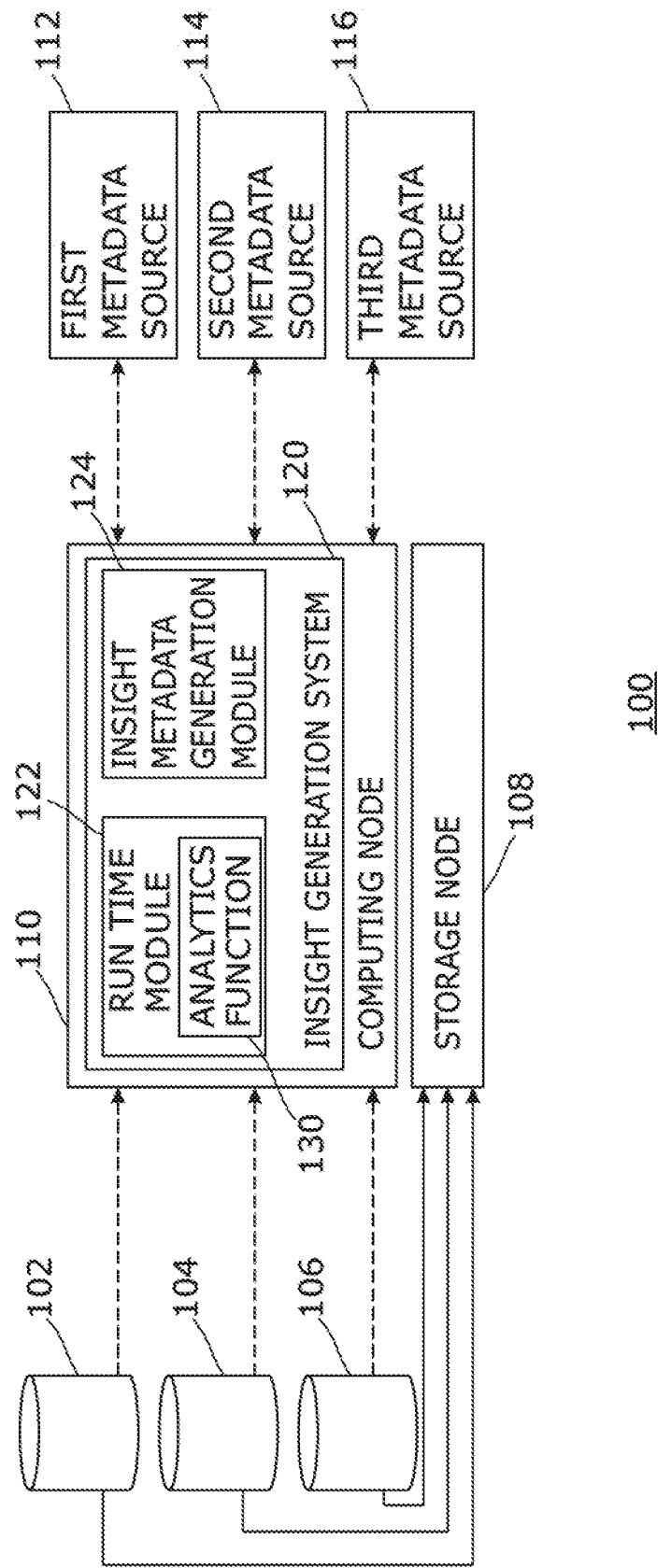
FIG. 1 is a block diagram of an example computing environment for generating insights from data.

Organizations may need to deal with a vast amount of data, which could range from a few terabytes to multiple petabytes. The data may be in structured, semi-structured, or unstructured form. The term big data may be used to describe large or complex data sets that may not be amenable to common data processing mechanisms. Big data may originate from various sources. These may include, by way of example, sales data, customer data, transactional data, and employee data. Even external data such as social interactions (for example, social networking data), web mail, chat data, blogs, news, and weather data may be used.

Big data may be useful to businesses in various ways. Enterprises may like to analyze big data to derive valuable business information. For example, mining big data may enable businesses to optimize operations, boost sales, make better decisions, improve customer management, identify new revenue streams, and acquire new customers. Considering its usefulness, businesses are looking for meaningful ways to derive various insights from big data.

An approach to generating information from data may include several data load functions that may involve loading data from a data source to a platform where an analytical function may be executed on the data. During this process, the data may undergo various Extract, Transform, and Load (ETL) processes. This may necessitate pulling data from a storage as input for every ETL phase and writing output data back to the storage for the next ETL operation. The storage of the output of one ETL process may either be in the form of persistent memory or faster I/O devices. However, preparing the data for use by an analytical program may involve multiple I/O operations on the storage device. The I/O operations are typically performed during execution of an analytics function. Thus, the time when the analytics information is requested to the time it is made available may span a long time (for example, hours) depending on the size of data and the ETL processes involved. This time also includes the expensive I/O operations involved in fetching the big data and writing back the intermediate transformed data. In other words, a lot of time may be spent in deriving analytics from the data.

In addition to the time taken to generate insights from the data, the time taken to design the feature vectors and weightage that each vector may be assigned is also a tedious task. This is typically performed by a user (for example, a data scientist). Further, the time spend in identifying whether the data can add value for a particular requirement or what kind of value the data may be able to provide is also difficult to estimate. Thus, this approach has several issues for building analytical systems that can provide out-of-box analytics.

Further, once insights are generated, it may be desirable if existing insights could be, for example, automatically associated with newly received data. It may be desirable to reuse the existing insights.

To address these issues, the present disclosure describes various examples for generating insights from data. An "insight" may be defined to include intermediate or resultant data that may get generated upon processing of data (for example, big data).

In an example, an insight generation system may receive data from a data source. The insight generation system may process the data using an analytic function to generate insights, wherein the insights may represent intermediate or resultant data that may get generated further to processing of the data. During generation of the insights, the insight generation system may associate metadata with the insights. The insight generation system may then store the insights along with the metadata.

The proposed solution provides a new mechanism for deriving, storing, and providing insights. The solution proposes an "Insight store" that may provide out-of-box analytics for an end user without the requirement of setting-up a platform or custom analytics functions for deriving insights. Insights may be perceived as composable entities whereby the output of an analytical function may be readily available for use by other analytical workflows or applications. Further, insights may be generated as soon as data becomes available. Thus, insights may be readily made available to a user for deriving timely business value.

FIG. 1 is a block diagram of an example computing environment 100 for generating insights from data. In an example, computing environment 100 may include a first data source 102, a second data source 104, a third data source 106, a storage node 108, a computing node 110, a first metadata source 112, a second metadata source 114, and a third metadata source 116. Although three data sources, one storage node, one computing node, and three metadata sources are shown in FIG. 1, other examples of this disclosure may include more or less than three data sources, more than one storage node, more than one computing node, and more or less than three metadata sources.

The storage node 108 may act as a repository of data, which may be sourced from the first data source 102, the second data source 104, and/or the third data source 106. The first data source 102, the second data source 104, and the third data source 106 may each store data, for example, in a database. The data may be generated from various sources, and may be of various kinds. By way of example, the data present in the first data source 102, the second data source 104, and the third data source 106 may include internal enterprise data (such as HR data, monitoring systems data, security data, and log systems data), and external data (such as stock market data, social media data (for example, data from social networking platforms), transport data, sensor data, search engine data, web content data, web-clicks data, and weather data). The data may include structured data (for example, relational data), semi-structured data (for example, XML data), and unstructured data (for example, word processor data). The data may include real time data (for example, social networking feeds).

The first data source 102, the second data source 104, and the third data source 106 may be in communication with the storage node 108, for example, via a computer network. Such a computer network may be a wireless or wired network. Such a computer network may include, for example, a Local Area Network (LAN), a Wireless Local Area Network (WAN), a Metropolitan Area Network (MAN), a Storage Area Network (SAN), a Campus Area Network (CAN), or the like. Further, such a computer network may be a public network (for example, the Internet) or a private network (for example, an intranet).

In an example, the storage node 108 may be a storage device. The storage device may be an internal storage device, an external storage device, or a network attached storage device. Some non-limiting examples of the storage device may include a hard disk drive, a storage disc (for example, a CD-ROM, a DVD, etc.), a storage tape, a solid state drive (SSD), a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In an example, the storage node 108 may be a Direct Attached Storage (DAS) device, a Network Attached Storage (NAS) device, a Redundant Array of Inexpensive Disks (RAID), a data archival storage system, or a block-based device over a storage area network (SAN). In another example, the storage node 108 may be a storage array, which may include a storage drive or plurality of storage drives (for example, hard disk drives, solid state drives, etc.). In an example, the storage node 108 may be a distributed storage node, which may be part of a distributed storage system that may include a plurality of storage nodes.

The storage node 108 may store raw data and/or processed data. Data may be pushed or pulled to the storage node 108, for example, from the first data source 102, the second data source 104, and/or the third data source 106. A data connector (for example, Flume) may be used to collect data from a data source (for example, the first data source). The storage node 108 may be in communication with the computing node 110, for example, via a computer network. Such a computer network may be similar to the computer network described above. In an example, the computing node and the storage node may be combined into a single node.

Computing node 110 may represent any type of computing system capable of reading machine-executable instructions. Examples of the computing system may include, without limitation, a server, a desktop computer, a notebook computer, a tablet computer, a thin client, a mobile device, a personal digital assistant (PDA), a phablet, and the like. The computing node 110 may be a distributed computing node, which may be part of a distributed computing system that may include a plurality of computing nodes. In an example, the computing node 110 may be a big data analytics platform or framework (for example, Hadoop, GraphDB, and Apache Spark) that may allow, in an example, a distributed processing of large datasets across a clusters of computers. The analytics platform may allow an analysis of a large amount of data (for example, big data) from a data source (for example, the first data source).

The computing node 110 may include an insight generation system 120. In an example, the insight generation system 120 may be hosted on a data analytics platform, for example, Hadoop. The insight generation system 120 may include a run time module 122 and an insight metadata generation module 124. The term "module" may refer to a software component (machine readable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. A module may reside on a volatile or non-volatile storage medium and interact with a processor of a computing node (for example, 110).

Some of the example functionalities that may be performed by the run time module 122 and the insight metadata generation module 124 are described in reference to FIG. 2 below. However, in an example, the run time module 122 may process data using an analytic function to generate insights, wherein the insights may represent intermediate or resultant data that may get generated further to processing. During generation of insights, the metadata generation module 124 may associate metadata with the insights.

The first metadata source 112, the second metadata source 114, and the third metadata source 116 may each be a source of metadata that may be associated with the insights generated by the run time module 122. For example, the first metadata source 112, the second metadata source 114, and the third metadata source 116 may each include a script or description provided by a user (for example, a developer) that may be shared along with a source code. In another example, the first metadata source 112, the second metadata source 114, and the third metadata source 116 may each include schemas, schema names, semantic schemas, and object store information. In a further example, the first metadata source 112, the second metadata source 114, and the third metadata source 116 may each include information related to connecter types, source tags, and source schemas that may be used to obtain data for the generation of insights. In a yet another example, the first metadata source 112, the second metadata source 114, and the third metadata source 116 may each be a source of lineage information related to insights. In an additional example, the first metadata source 112, the second metadata source 114, and the third metadata source 116 may each include description of an analytics function(s) that may be used to generate insights.

The first metadata source 112, the second metadata source 114, and the third metadata source 116 may each be in communication with the computing node 110 and/or storage node 108, for example, via a computer network. Such a computer network may be similar to the computer network described above. In an example, the computing node and the storage node may be combined into a single node.

Examples of metadata that may be associated with insights generated by the run time module 122 may include information related to the analytic function(s) that may be used to generate an insight from data (for example, sentiment analysis, and topic modelling), domain of data used to generate an insight (for example, review), type of data used to generate an insight (for example, text and graph), source of data used to generate an insight (for example, HR system and social networking data), lineage of data used to generate an insight, description of an insight, time of generation of an insight, and API (Application Programming Interface) used for accessing an insight.

Figure 2:
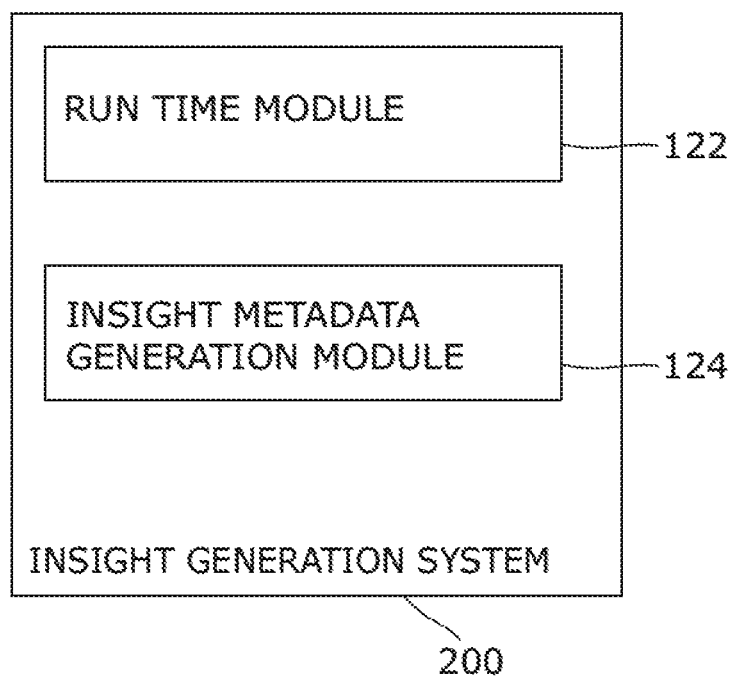
FIG. 2 is a block diagram of an example system for generating insights from data.

FIG. 2 is a block diagram of an example insight generation system 200. In an example, the insight generation system 200 may be present on the computing node 110 or storage node 108 of FIG. 1. In another example, if the computing node 110 and the storage node 108 are combined into a single node, the insight generation system 200 may be present on the combined node.

The insight generation system 200 may include a run time module 122 and an insight metadata generation module 124. In an example, these modules may be similar to the run time module and the insight metadata generation module of FIG. 1. For the sake of brevity, components or reference numerals of FIG. 2 having a same or similarly described function in FIG. 1 are not being described in connection with FIG. 2. The components or reference numerals may be considered alike.

In an example, the run time module 122 may receive and acquire data (i.e. input data) from a data source or a plurality of data sources (for example, first data source 102 and second data source 104). The collected data may be processed by the run time module 122, for example, by using an analytics function(s) or program(s) 130. Some of the non-limiting examples of the analytics functions that may be used to process the data may include topic extraction, impact analytics, log analytics, sentiment analytics, trend analytics, moving average, influence maximization, and feature extraction.

In an example, a plurality of analytics functions may be used to process the data. The plurality of functions may be part of an analytics workflow that may be used during data processing. Some of the non-limiting examples of processing that the data may undergo or subjected to may include transformation (for example, as part of an ETL process), formatting, conversion, mapping, classification, analysis, summarization, and clustering. The analytics functions may be used to analyze data, discover patterns, and propose new analytical models to recognize identified patterns.

The processing of data by the run time module 122, for example, by using an analytics function(s) may lead to generation of intermediate data and/or resultant data. The intermediate or resultant data generated due to processing may be termed as "insights" on the input or original data. In an example, data processing may involve a plurality of stages. In such case, intermediate data generated further to a stage (or after each stage) may represent insights on the data. During data processing, intermediate data of a stage may act as input data for the next stage. Thus, processing of an input data by the run time module 122 may lead to generation of a plurality of insights, which may represent intermediate or resultant data. The insights may be stored on a storage device (for example, storage node 108).

Figure 3:
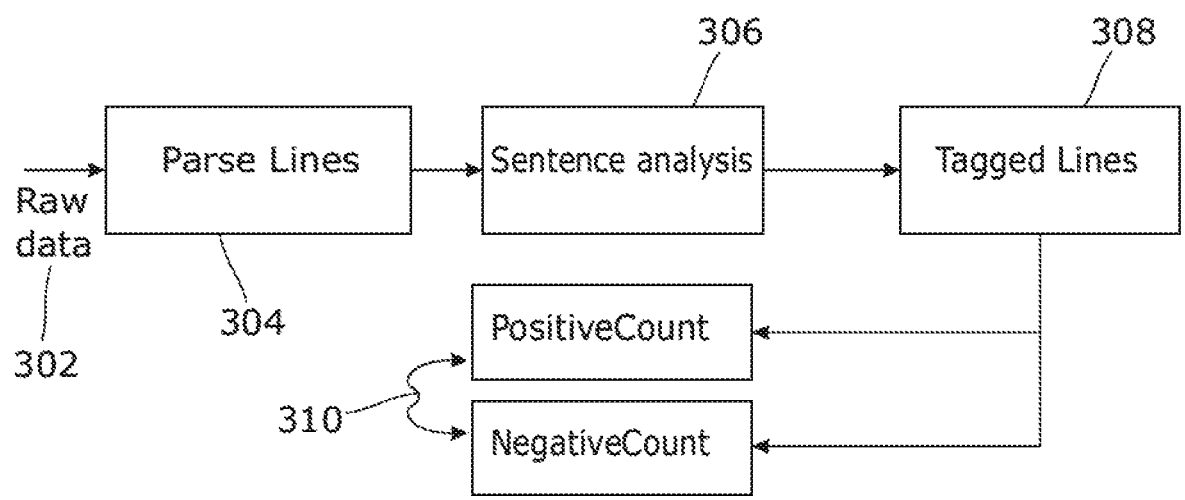
FIG. 3 is a block diagram of example insights from an input data.

FIG. 3 shows a block diagram of examples insights generated from an input data. In an example, the run time module 122 may process raw data using a Sentiment analytics function. Sentiment analytics may be used to determine whether an input (for example, unstructured data such as a blog and a movie review) is positive, negative or neutral. It's also known as opinion mining that is used to derive the opinion or attitude of a writer. In the present context, a movie review by a user may be considered as input or raw data 302. A sentiment analyzer in the run time module 122 may parse the lines in the review into each sentence and the output of the parsed file (set of individual lines) may be passed to a sentiment model, which may attach a tag i.e. a positive or negative score to the system. Transformation operations may be performed on the raw data until the data is transformed to the form to the model's requirement. The intermediate data that gets generated further to processing of the data may be termed as insights generated by the sentiment analytics function. In the present example, the insights may include the output of the "parse lines" 304, which may include parsed individual lines; output of "sentiment analysis" 306, which may include each line tagged with a polarity value 308; and the output of the positive and the negative count functions 310.

The insight metadata generation module 124 may determine the generation of insights by the run time module 122. In an example, as the insights get generated (i.e. on the fly), the insight metadata generation module 124 may identify relevant metadata for association with the insights. In other words, during the generation of insights, the insight metadata generation module 124 may proceed to identify relevant metadata for the insights. In an example, the insight metadata generation module 124 may determine the generation of insights by the run time module by interpreting or intercepting calls made to the storage node for accessing or acquiring the data, and/or storing the data. For example, these may be respective get/read and put/write iterator calls. In another example, lineage tracking plugins may be used in the data analytics framework (e.g. Spark) to allow storage node to intercept the workflow to detect insight generation. In an example, these calls may interpreted at the time when an analytics function(s) is processing the data. In another example, the insight metadata generation module may identify relevant metadata further to the generation of insights.

Upon such identification, the insight metadata generation module 124 may associate the identified metadata with the insights. As explained earlier, multiple groups of insights (intermediate and/or resultant data) may get generated by the run time module 122 consequent to data processing. In such case, the insight metadata generation module may identify relevant metadata for each group of insights.

The insight metadata generation module 124 may acquire metadata information for an insight (or a group of insights) from a metadata source (for example, the first metadata source 112). Once metadata information related to an insight is acquired, the insight metadata generation module 124 may associate the metadata information with the insight. In an example, associating metadata with insights may include analyzing a plurality of groups of insights by the run time module. Based upon the analysis, the insight metadata generation module 124 may identify metadata for each group of insights. Upon identification, the insight metadata generation module 124 may associate the metadata with each group of insights.

In an example, associating metadata with an insight may include analyzing the data structure of the insight by the insight metadata generation module 124. Based on the analysis, the insight metadata generation module may identify metadata information for the insight, and acquire (or receive) the metadata information from a metadata source. The insight metadata generation module 124 may then associate the metadata information with the insight.

Figure 4:
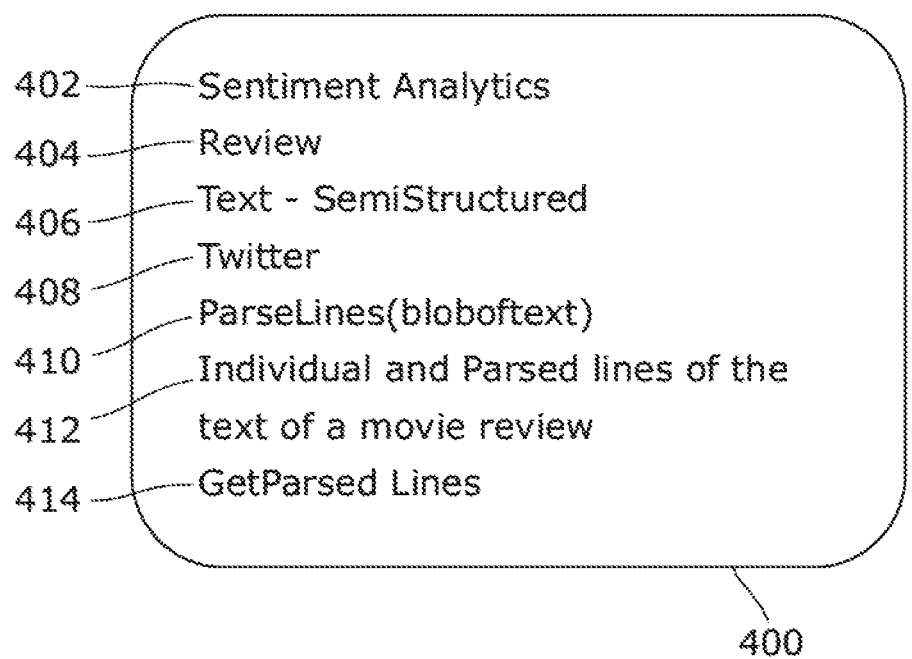
FIG. 4 illustrates a block diagram of example metadata for association with insights of FIG. 3.

FIG. 4 illustrates a block diagram of example metadata 400 for association with the insights of FIG. 3. In the context of example mentioned earlier with reference to FIG. 3, the following example metadata information may be associated with the insights ("parsed lines") that get generated further to processing of raw data ("movie review") by sentiment analytics: analytics ("sentiment analytics") 402, domain ("movie review") 404, type of data ("semi-structured text") 406, source of data ("Blog") 408, lineage information ("ParseLines (text)) 410; description of the output ("Individual and parsed lines of the text of a movie review") 412, and API to access the data ("GetParsed Lines") 414.

Further to association of metadata with the insights by the insight metadata generation module 124, the insights along with the metadata may be stored on a storage device (for example, storage node 108). In an example, the location and/or the API on how to access the insights along with the metadata may also be stored on the storage device.

Figure 5:
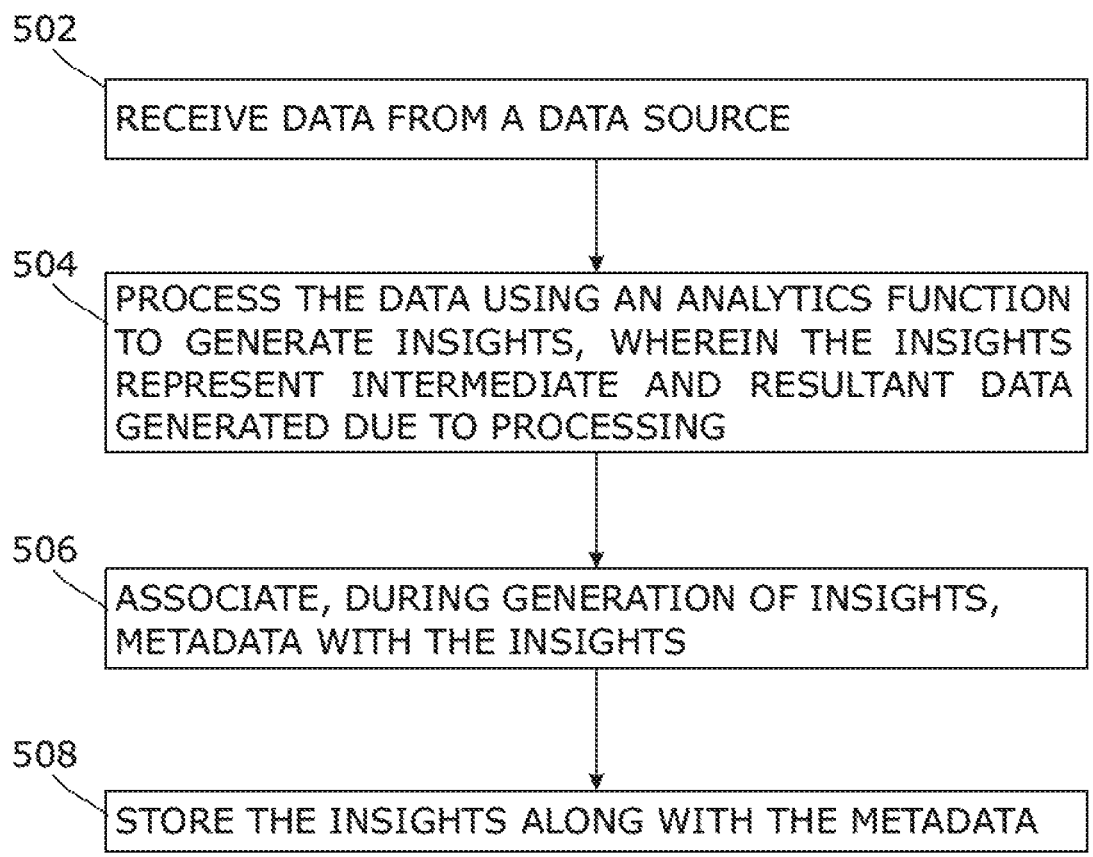
FIG. 5 is a flowchart of an example method for generating insights.

FIG. 5 is a flowchart of an example method 300 for generating insights from data. The method 500, which is described below, may at least partially be executed on a computer or storage system, for example, computing node and storage node of FIG. 1. However, other computing devices may be used as well. At block 502, data may be received from a data source. At block 504, the data may be processed using an analytics function to generate insights, wherein the insights may represent intermediate or resultant data generated due to processing. At block 506, during generation of the insights, metadata may be associated with the insights. At block 508, the insights may be stored along with the metadata.

In an example, the insights may be used by another analytics function (i.e. other than the one that generated the insights) or an application. In other words, once the insights are generated they may be used by other programs (machine-executable instructions).

Figure 6:
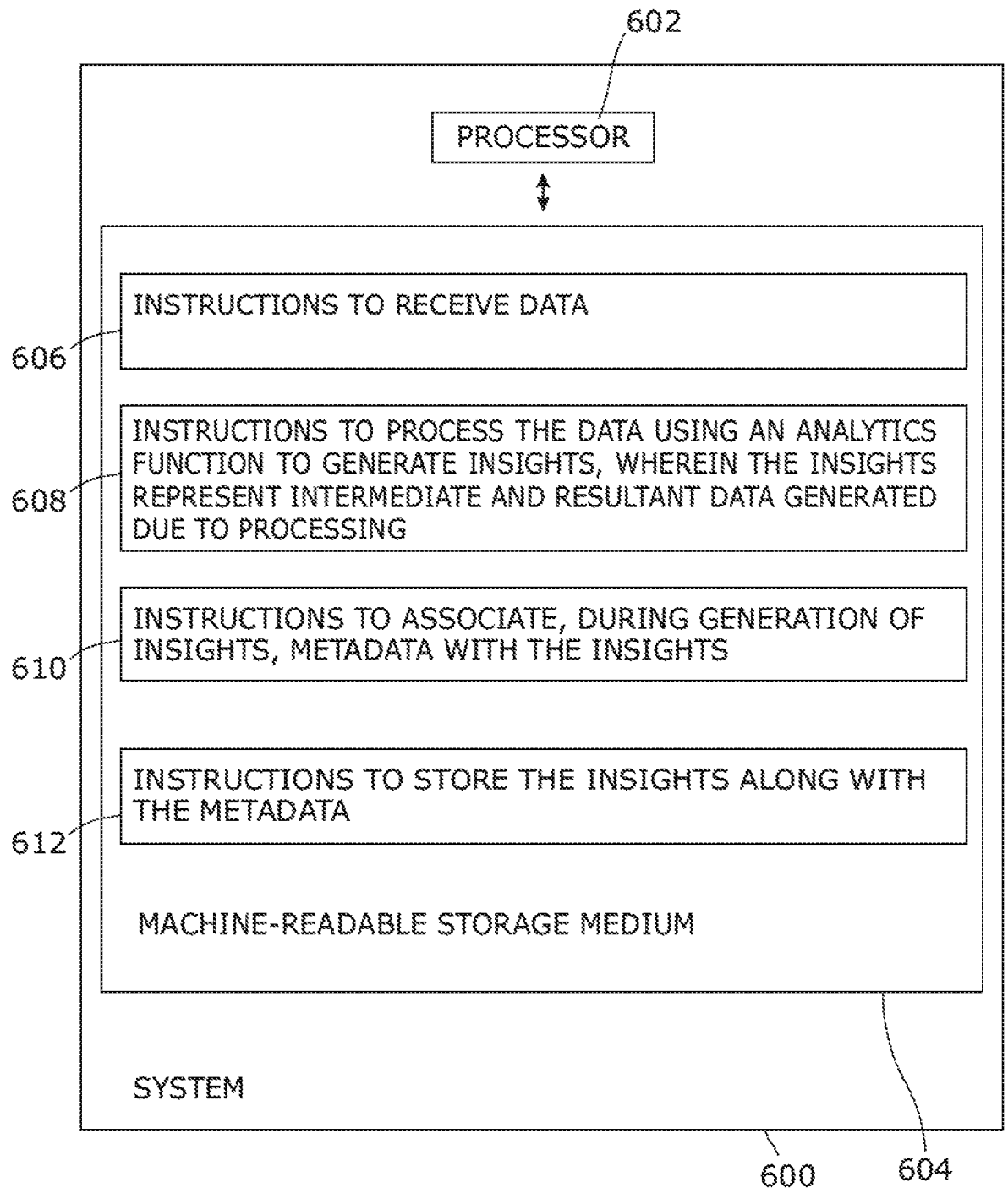
FIG. 6 is a block diagram of an example system for generating insights.

FIG. 6 is a block diagram of an example system 600 for generating insight from data. System 600 includes a processor 602 and a machine-readable storage medium 604 communicatively coupled through a system bus. In an example, system 600 may be analogous to computing node 100 and storage node 108 of FIG. 1. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 604 may be a non-transitory machine-readable medium. Machine-readable storage medium 604 may store instructions 606, 608, 610, and 612. In an example, instructions 606 may be executed by processor 602 to receive data. Instructions 608 may be executed by processor 602 to process the data using an analytics function to generate insights, wherein the insights represent intermediate or resultant data generated due to processing. Instructions 610 may be executed by processor 602 to associate, during generation of insights, metadata with the insights. Instructions 612 may be executed by processor 602 to store the insights along with the metadata.

Figure 7:
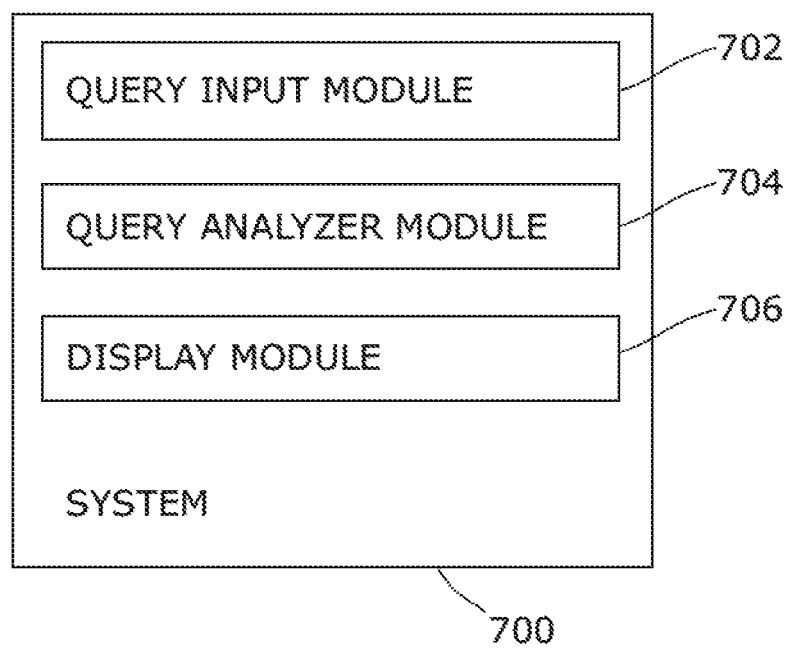
FIG. 7 is a block diagram of an example system for searching insights.

FIG. 7 is a block diagram of an example system 700 for searching insights. In an example, the system 700 may be present on a computing node (for example, 110) or storage node (for example, 108). In another example, if the computing node and the storage node are combined into a single node, the system 700 may be present on the combined node.

The system may include a query input module 702, a query analyzer module 704, and a display module 706.

The query input module 702 may be used to receive a query to search for an insight(s). As mentioned earlier, an insight may represent intermediate or resultant data that may get generated upon processing of data by an analytics function. During generation of the insight, metadata may be associated with the insight. An example mechanism to generate insights from data has been described in detail earlier in reference to FIGS. 1 to 6.

A query to search for an insight(s) may include a keyword(s) or search string. The query may include a character or set of characters, which may include, for example, alphabets, numerals, alphanumeric character, special characters (for example, !@#), or a combination thereof.

The query input module 702 may include an interface for receiving a query for searching an insight. In an example, the interface may include a user interface (for example, a Graphical User Interface and a Command Line Interface) for receiving the query from a user. In another example, the interface may include an Application Programming Interface (API). In an example, the API may be used by an application to search for an insight(s).

A query received by the query input module 702 may be analyzed by the query analyzer module 704 to determine whether an insight(s) corresponding (or partially corresponding) to the query is present. In an example, the query module may search a repository that stores insights (and associated metadata) to determine whether an insights(s) matching the query is present in the repository. In an example, the insights present in the repository may be indexed.

In the event, the query analyzer module 704 identifies are insight(s) corresponding (or partially corresponding) to the query, a display module 706 may present the insight (for example, to a user or an application). In an example, the display module may present information related to the identified insight(s). The information related to the insight may include, for example, information related to the analytic function used for generating the insight, domain of the data used for generating the insight, type of the data used for generating the insight, source of the data used for generating the insight, lineage of the data used for generating the insight, description of the insight, generation time of the insight, and API (Application Programming Interface) for accessing the insight.

In an example, the insight(s) identified by the analyzer module may be presented based on a priority assigned to the insight(s). In an example, the priority may be assigned based on usage of the insight. In another example, the priority may be assigned based on age of the insight.

In an example, the display module 706 may include a Visual Display Unit (VDU), for example, a computer monitor.

Figure 8:
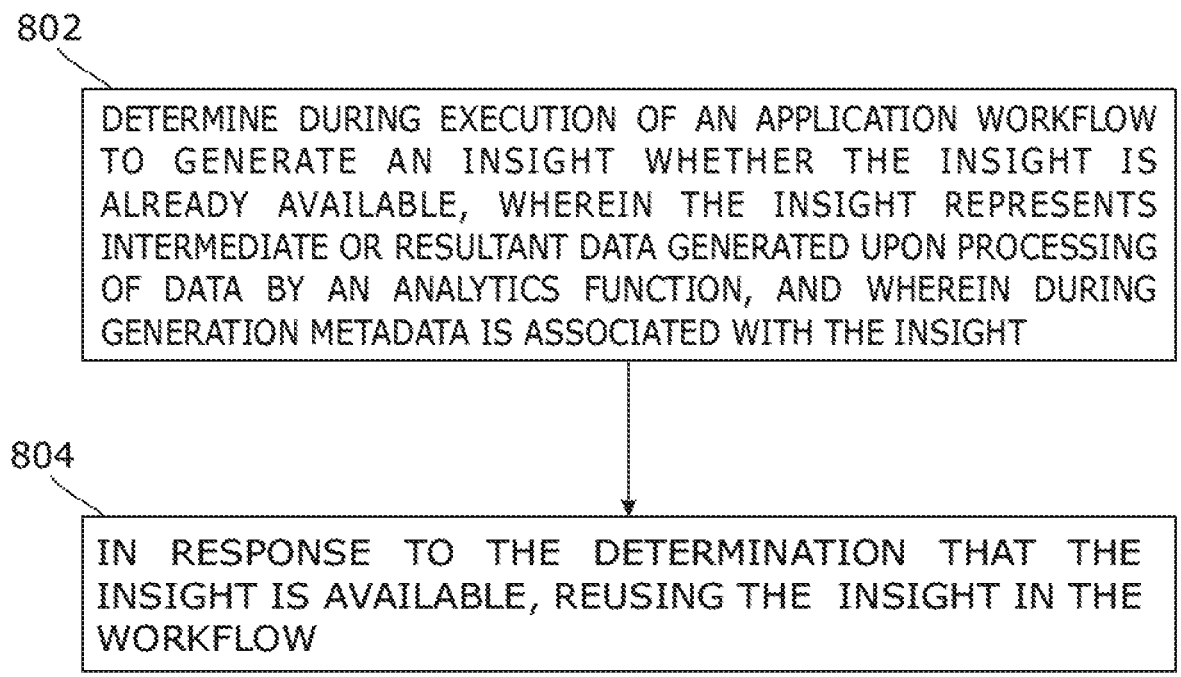
FIG. 8 is a flowchart of an example method for searching insights.

FIG. 8 is a flowchart of an example method 800 for searching insights. The method 800, which is described below, may at least partially be executed on a computer and/or storage system, for example, computing node 110 and storage node 108 of FIG. 1. However, other computing devices may be used as well.

In an example, method 800 may be used by an application to automatically determine whether an insight is available that could be used as part of the application's workflow. A computer application may be able to identify and reuse an existing insight(s), which may have been generated earlier by the same application or another application. At block 802, a determination may be made (for example, by an application) during or prior to execution of a workflow to generate an insight whether the insight is already available. As mentioned earlier, an insight may represent intermediate or resultant data generated (or likely to be generated) upon processing of data by an analytics function, wherein during generation metadata is associated with the insight. In an example, the determination may be made before the tasks corresponding to a call to action are run by the application. In an example, the determination may be made by analyzing the lineage information of a previously computed data. The lineage information may be present on a storage node (for example, 108). A lineage record may define the dependencies between a set of input files and output files and the binary programs that were used to derive the output from the input. Thus, in an example, the lineage information or "lineage" of data may include input data (or input files), information related to analytics function(s) applied on the input data (for example, a list of transformations applied to the input data), and the output data generated consequent to the application of an analytics function(s) on the input data. In an example, the lineage information may be stored as metadata along with output data (or "insight").

At block 804, in response to the determination that a specific analytic function(s) has already been applied earlier to same data, for example as part of the same application work or another application workflow, and an output thereof i.e. an insight(s) is available, the application may use the existing insight in its workflow. Therefore, an existing insight that may have been previously generated, for example, by an application may be used by another application. This allows reuse of an insight across application contexts. A suitable API may be used for this purpose. In an example, once an existing insight from a previous workflow is used in the current workflow, the latter may be refrained from generating the insight.

Figure 9:
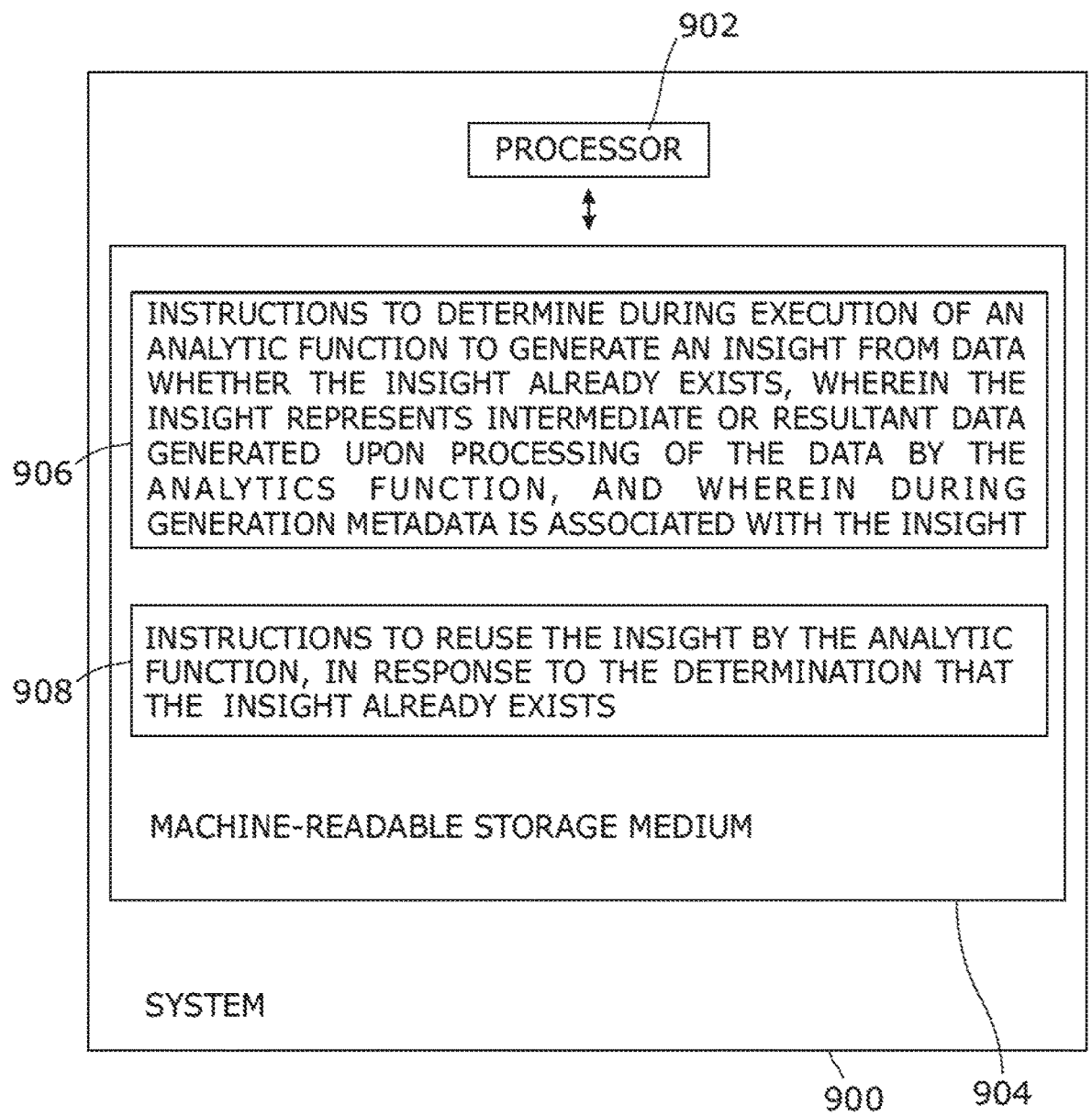
FIG. 9 is a block diagram of an example system for searching insights.

FIG. 9 is a block diagram of an example system 900 for searching insights. System 900 includes a processor 902 and a machine-readable storage medium 904 communicatively coupled through a system bus. In an example, system 900 may be analogous to computing node 100 and storage node 108 of FIG. 1. Processor 902 may be any type of Central Processing Unit (CPU), microprocessor, or processing logic that interprets and executes machine-readable instructions stored in machine-readable storage medium 904. Machine-readable storage medium 904 may be a random access memory (RAM) or another type of dynamic storage device that may store information and machine-readable instructions that may be executed by processor 902. For example, machine-readable storage medium 904 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 904 may be a non-transitory machine-readable medium. Machine-readable storage medium 904 may store instructions 906 and 908. In an example, instructions 906 may be executed by processor 902 to determine during execution of an analytic function to generate an insight from data whether the insight already exists, wherein the insight represents intermediate or resultant data likely to be generated upon processing of the data by the analytics function, and wherein during generation metadata is associated with the insight. Instructions 908 may be executed by processor 902 to reuse the insight by the analytic function, in response to the determination that the insight already exists.

In an example, the instructions to determine whether the same insight already exists (i.e. 906) may include instructions to analyze lineage information of the insight. In an example, the lineage information of the insight may comprise input data used to generate the insight, information related to transformations applied on the input data, and output data generated consequent to application of transformations on the input data.

The machine-readable storage medium may further include instructions to search for the insight in a repository, and to present the insight for selection by a user.

Figure 10:
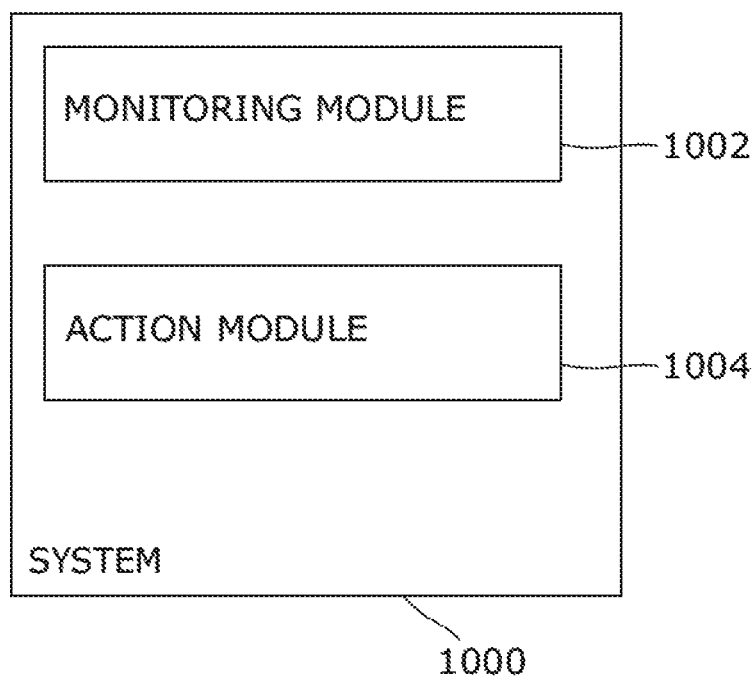
FIG. 10 is a block diagram of an example system for managing insights.

FIG. 10 is a block diagram of an example system 1000 for managing insights. In an example, the system 1000 may be present on a computing node (for example, 110) or storage node (for example, 108). In another example, if the computing node and the storage node are combined into a single node, the system 1000 may be present on the combined node.

The system 1000 may include a monitoring module 1002 and an action module 1004. The monitoring module 1002 may monitor an aspect related to an insight. As mentioned earlier, an insight may represent intermediate or resultant data that may get generated upon processing of data by an analytics function. During generation of the insight, metadata may be associated with the insight. An example mechanism to generate and search insights from data has been described in detail earlier in reference to FIGS. 1 to 9.

The action module 1004 may perform an action related to the insight, based on the monitoring carried out by the monitoring module.

In an example, an aspect related to an insight that may be monitored may include usage of the insight. In such case, in an example, the action may include discarding the insight if the usage of the insight is below a pre-defined value. In another example, the action may include retaining the insight if the usage of the insight is above a pre-defined value. In another example, the action may include ranking the insight based on the usage of the insight.

In another example, an aspect related to an insight that may be monitored may include usage of the insight. In such case, in an example, the action may include discarding insight if the insight is not used during the time period.

In another example, an aspect related to an insight that may be monitored may include the age of the insight. In such case, in an example, the action may include retaining the insight if the insight is below a pre-defined age. In a yet another example, the action may include discarding the insight if a same insight with an age lower than the insight is available. In a further example, the action may include discarding the insight if a newer insight on the data is available. In a still further example, the action may include discarding the insight if the insight is above a pre-defined age.

In an example, a timestamp may be used to monitor an aspect related to the insight. The timestamp may be stored in the metadata associated with the insight. The metadata may include, for example, information related to the analytic function used for generating the insight, domain of the data used for generating the insight, type of the data used for generating the insight, source of the data used for generating the insight, lineage of the data used for generating the insight, description of the insight, generation time of the insight, and API (Application Programming Interface) for accessing the insight.

In another example, an aspect related to an insight that may be monitored may include the generation stage of the insight relative to another insight generated from the same data. As mentioned earlier, an insight may include "intermediate" or "resultant" data that may get generated upon processing of data by an analytics function. In an example, an application workflow may include generation of a plurality of "intermediate" and "resultant" insights. All of these may not provide same value in terms of information they may represent.

In an example, a Directed Acyclic Graph (DAG) may be used to represent insight generation stages during the course of data processing as part of a workflow. In the graph, the nodes may represent the input files and the output files, and the edges may represent the list of transformations. The different levels in the graph may be visualized as representing increasing value of data. For example, the root of the graph may represent the raw data that is being captured and the leaf nodes may represent the final insights that may be derived from the raw data. The intermediate levels may represent outputs of intermediate stages.

Upon walking through the lineage graph in topological order, i.e. as the depth of the graph increases, the value of the insights generated also increases. For example, raw data which is at the top of the graph may be less valuable than an insight generated therefrom which is at the next level in the graph. In an example, upon monitoring or identifying the generation stage of various insights in a workflow, the action may include assigning relatively more value to an insight compared to the another insight if the generation stage of the insight is later than the another insight. In another example, the action may include assigning relatively more value to an insight compared to another insight if the generation time of the insight is later than another insight.

In an example, based on values assigned, the insights may be managed differently. For example, based on values assigned, the insights may be stored on different storage tiers. More valuable insights may be stored in relatively costlier tiers (for example, memory, SSD) as compared to less valuable insights. In another example, more valuable insights may not be compressed or deduplicated as compared to less valuable insights so that the former could be retrieved faster.

Figure 11:
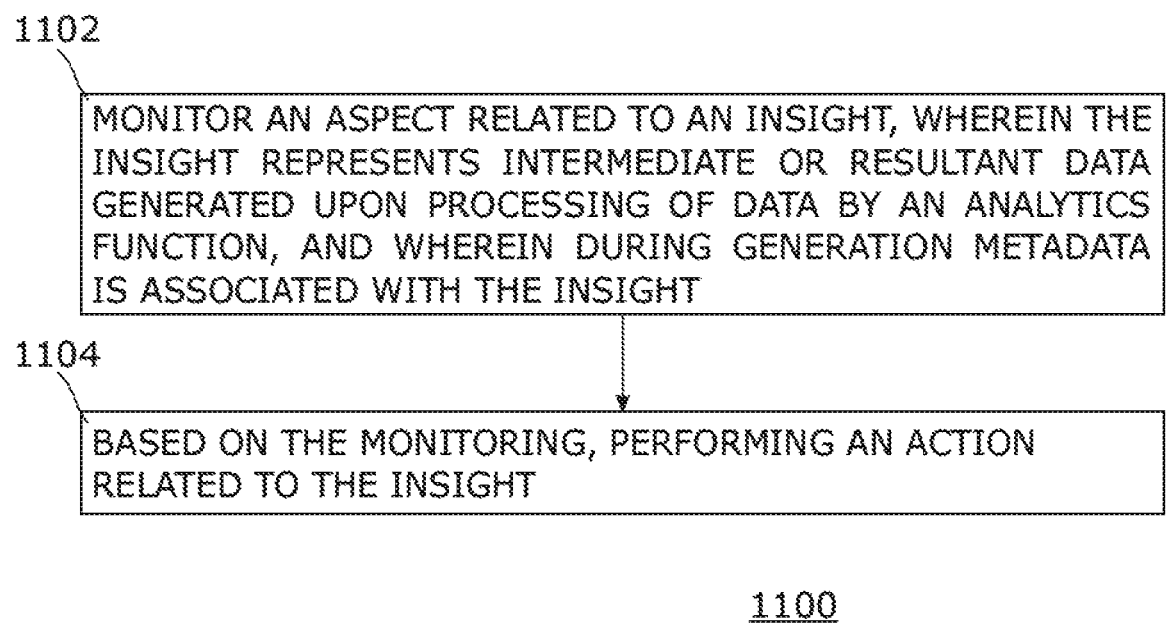
FIG. 11 is a flowchart of an example method for managing insights.

FIG. 11 is a flowchart of an example method 1100 for managing insights. The method 1100, which is described below, may at least partially be executed on a computer or storage system, for example, computing node 110 and storage node 108 of FIG. 1. However, other computing devices may be used as well. At block 1102, an aspect related to an insight may be monitored, wherein the insight may represent intermediate or resultant data generated upon processing of data by an analytics function, and wherein during generation metadata is associated with the insight. At block 1104, an action related to the insight may be performed, based on the monitoring.

Figure 12:
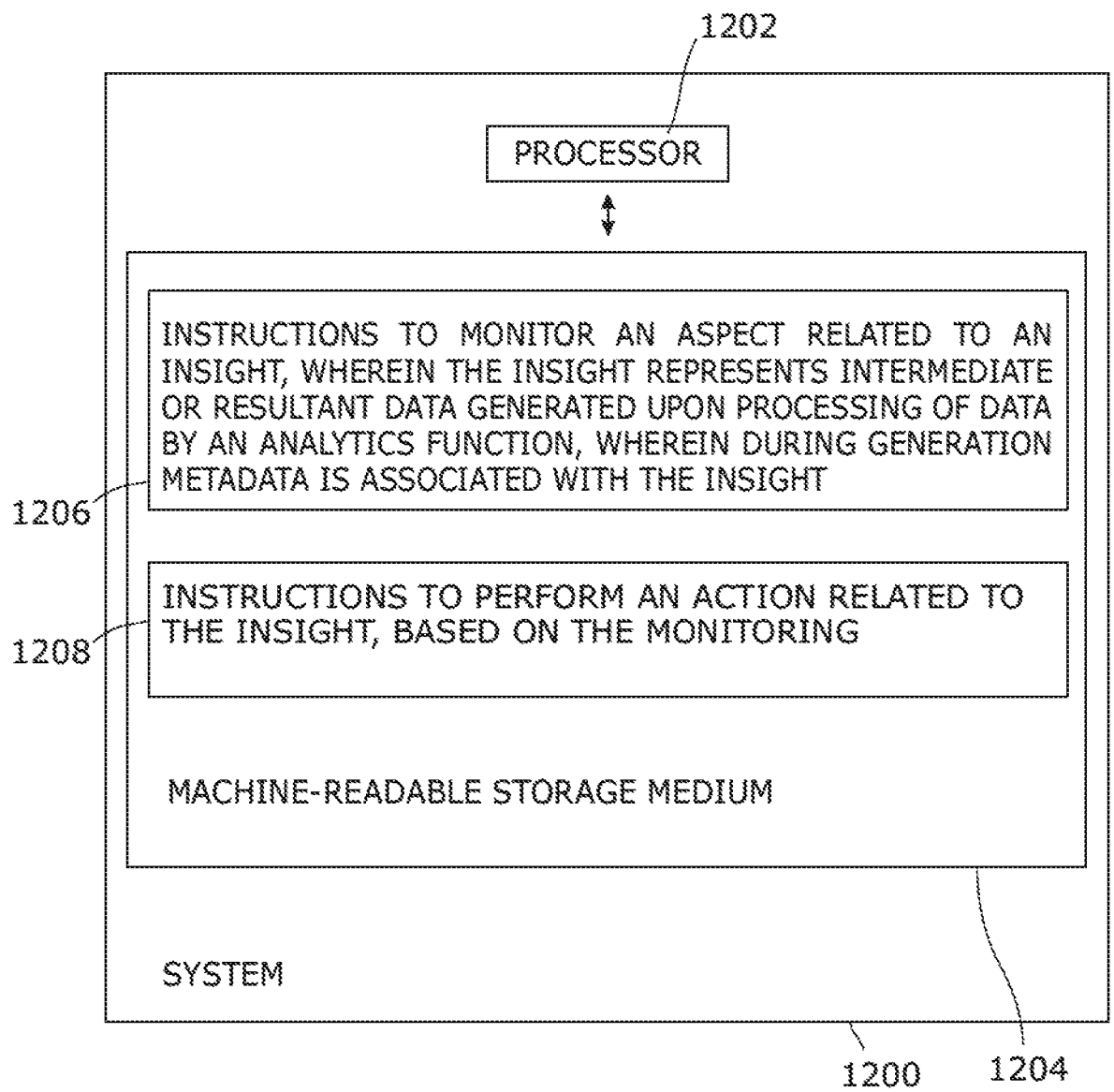
FIG. 12 is a block diagram of an example system for managing insights.

FIG. 12 is a block diagram of an example system 1200 for managing insights. System 1200 includes a processor 1202 and a machine-readable storage medium 1204 communicatively coupled through a system bus. In an example, system 1200 may be analogous to computing node 100 and storage node 108 of FIG. 1. Processor 1202 may be any type of Central Processing Unit (CPU), microprocessor, or processing logic that interprets and executes machine-readable instructions stored in machine-readable storage medium 1204. Machine-readable storage medium 1204 may be a random access memory (RAM) or another type of dynamic storage device that may store information and machine-readable instructions that may be executed by processor 1202. For example, machine-readable storage medium 1204 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 1204 may be a non-transitory machine-readable medium. Machine-readable storage medium 1204 may store instructions 1206, and 1208. In an example, instructions 1206 may be executed by processor 1202 to monitor an aspect related to an insight, wherein the insight may represent intermediate or resultant data generated upon processing of data by an analytics function, wherein during generation metadata is associated with the insight. Instructions 1208 may be executed by processor 1202 to perform an action related to the insight, based on the monitoring.

Figure 13:
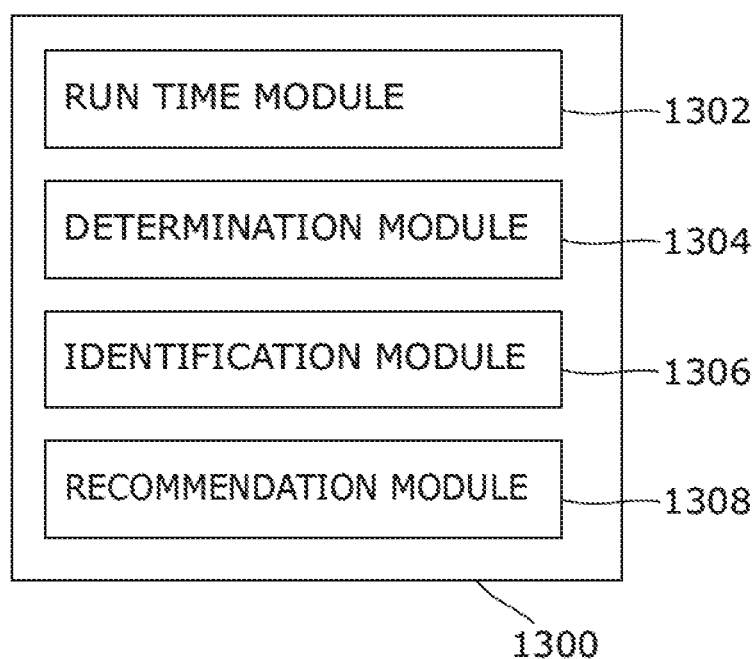
FIG. 13 is a block diagram of an example system for associating an insight with data.

FIG. 13 is a block diagram of an example system 1300 for associating an insight with data. In an example, the system 1300 may be present on a computing node (for example, 110) or storage node (for example, 108). In another example, if the computing node and the storage node are combined into a single node, the system 1300 may be present on the combined node.

The system 1300 may include a run time module 1302, a determination module 1304, an identification module 1306, and a recommendation module 1308.

The run time module 1302 may be used to receive data from a data source. In an example, the run time module may be similar to run time module 122 of FIG. 1. The determination module 1304 may be used to determine whether data type of the received data (i.e. new data) is same as compared to an earlier data or existing data. In an example, the data and the earlier (or existing data) may be from the same source. In another example, the data and the earlier (or existing data) may be from different sources.

In an example, the determination module 1304 may determine whether data type of the data is partially same as compared to an earlier data (or existing data).

In response to the determination by the determination module 1304 that data type of the data is same as compared to an earlier (or existing data), the identification module 1306 may identify an insight(s) generated from the earlier data (or existing data), wherein the insight may represent intermediate or resultant data generated upon processing of the existing data by an analytics function, and wherein during generation metadata is associated with the insight.

In an example, the determination module 1304 may determine whether data type of the data is same (or partially same) as compared to an earlier data (or existing data) by comparing structure of the data with structure of the earlier data. In another example, the determination module may determine whether data type of the data is same (or partially same) as compared to an earlier data (or existing data) by comparing schema of the data with schema of the earlier data.

In response to the determination by the determination module 1304 that data type of the data is same as compared to an earlier (or existing data), the identification module 1306 may identify an insight(s) generated from the earlier data (or existing data). Likewise, in response to the determination by the determination module that data type of the data is partially same as compared to an earlier (or existing data), the identification module 1306 may identify the portion of the earlier data that is same compared to the data. The identification module may further identify an insight(s) generated from the portion of the earlier data (or existing data). The identification module may identify the insight(s) from a repository that stores the insight(s).

Further to identification of a insight(s) from earlier data or a portion of the earlier data, the identification module 1306 may identify the analytics function(s) used for generating the insight from the earlier data. For example, if sentiment analysis was used for generating the insight from the earlier data, the same may identified. Once the analytics function(s) has been identified, recommendation module may present the analytics function(s), for example, to a user. The recommendation module 1308 may also recommend using the analytics function to generate a corresponding insight from the new data. For example, if "Positive Count" sentiment analysis is identified as the function previously used for generating an insight from the earlier data, the same may be recommended for use on the new data.

The recommendation module 1308 may recommend an identified insight based on a priority assigned to the insight. In another example, the recommendation module may recommend the insight based on usage of the insight. In a yet another example, the recommendation module may recommend the insight based on age of the insight.

In an example, once the recommendation module 1308 recommends an analytics function(s) to generate an insight from the new data, a user or an application may select the analytics function(s). Upon selection, the run time module may use the analytics function(s) to generate an insight(s) from the new data. For example, if "Positive Count" sentiment analytics is selected, the analytics may be used to generate an insight(s) from the new data.

In another example, an analytics function(s) identified by the identification module 1306 may not require active selection by a user or an application prior to the application of the identified function on the new data. In response to the determination by the determination module that data type of the new data is same as compared to an earlier (or existing data), the analytics functions that were used to generate insights from the earlier data (or existing data) may be automatically triggered by the run time module to generate insights from the new data. In case, there is a partial match between the new data and the earlier data, the insights that were generated from the matched portion of the earlier data may be automatically generated by the run time module. The lineage information available in the metadata may be used to search for insights with a lineage that matches with the partial data. The lineage information may include information related to analytic function(s) or processes by which these insights may be generated. If there exists a set of insights that may be derived from this partial list of matching input entries then the same type of insights may be generated for the new data.

Figure 14:
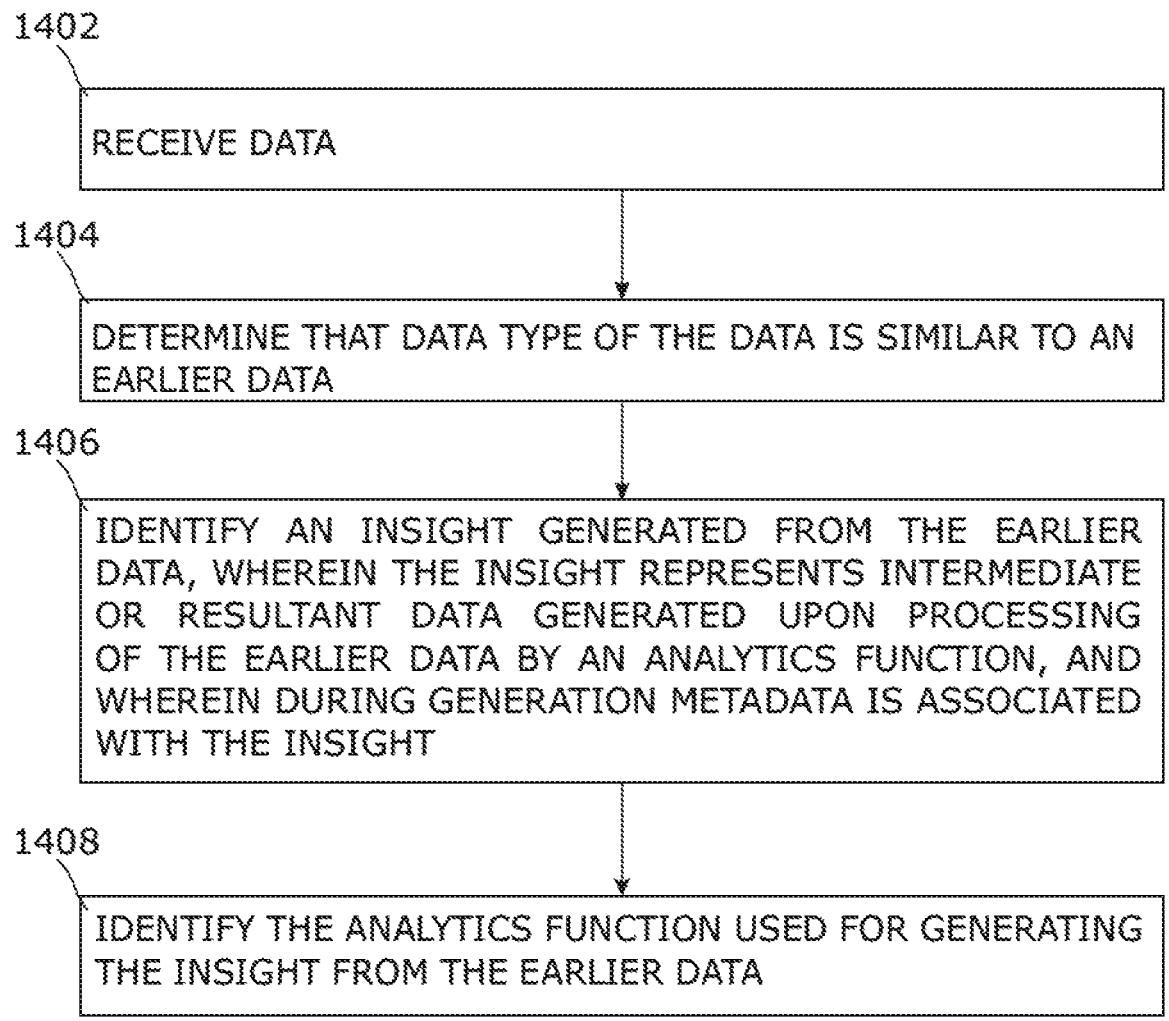
FIG. 14 is a flowchart of an example method for associating an insight with data.

FIG. 14 is a flowchart of an example method 1400 for associating an insight with data. The method 1400, which is described below, may at least partially be executed on a computer or storage system, for example, computing node 110 and storage node 108 of FIG. 1. However, other computing devices may be used as well. At block 1402, data may be received by a system (for example, 108 and 110). At block 1404, a determination may be made that data type of the data is same as compared to an earlier data. At block 1406, an insight generated from the earlier may be identified, wherein the insight may represent intermediate or resultant data generated upon processing of the earlier data by an analytics function, and wherein during generation metadata is associated with the insight. At block 1408, the analytics function used for generating the insight from the earlier data may be identified.

Figure 15:
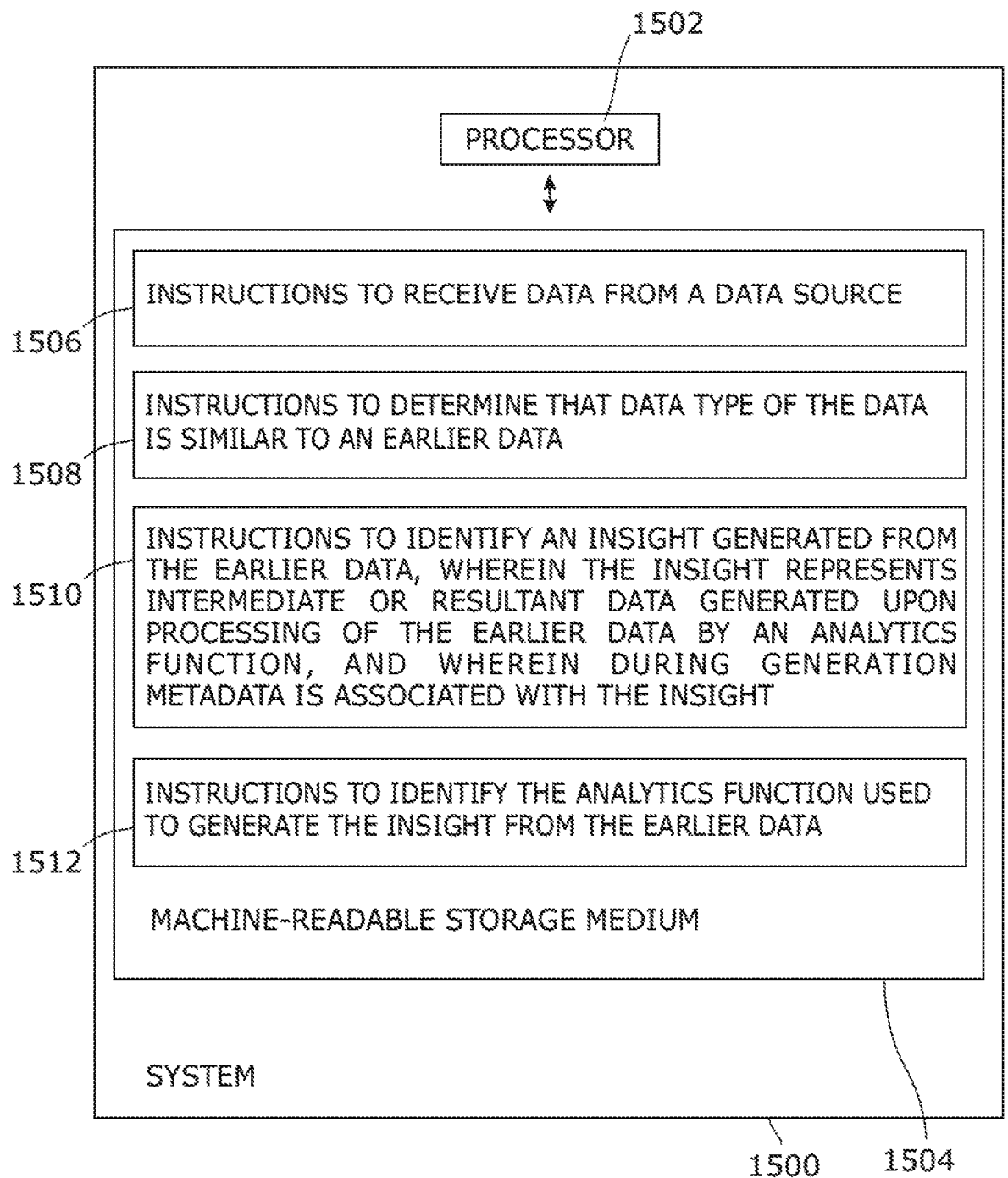
FIG. 15 is a block diagram of an example system for associating an insight with data.

FIG. 15 is a block diagram of an example system 1500 for associating an insight with data. System 1500 includes a processor 1502 and a machine-readable storage medium 1504 communicatively coupled through a system bus. In an example, system 1500 may be analogous to computing node 100 and storage node 108 of FIG. 1. Processor 1502 may be any type of Central Processing Unit (CPU), microprocessor, or processing logic that interprets and executes machine-readable instructions stored in machine-readable storage medium 1504. Machine-readable storage medium 1504 may be a random access memory (RAM) or another type of dynamic storage device that may store information and machine-readable instructions that may be executed by processor 1502. For example, machine-readable storage medium 1504 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 1504 may be a non-transitory machine-readable medium. Machine-readable storage medium 1504 may store instructions 1506, 1508, 1510, and 1512. In an example, instructions 1506 may be executed by processor 1502 to receive data from a data source. Instructions 1508 may be executed by processor 1502 to determine that data type of the data is same as compared to an earlier data. Instructions 1510 may be executed by processor 1502 to identify an insight generated from the earlier data, wherein the insight represents intermediate or resultant data generated upon processing of the earlier data by an analytics function, and wherein during generation metadata is associated with the insight. Instructions 1512 may be executed by processor 1502 to identify the analytics function used to generate the insight from the earlier data.

For the purpose of simplicity of explanation, the example method of FIGS. 5, 8, 11, and 14 is shown as executing serially, however it is to be understood and appreciated that the present and other examples are not limited by the illustrated order. The example systems of FIGS. 1, 2, 6, 7, 9, 10, 12, 13, 15 and method of FIGS. 5, 8, 11, and 14 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

We claim:

1. A method of associating an insight with data, comprising:
receiving new data from a data source;
determining that data type of the new data is same as compared to an earlier data; and
identifying an insight generated from the earlier data, wherein the insight represents intermediate or resultant data generated upon processing of the earlier data by an analytics function, wherein metadata generated for and associated with the insight is used to identify the insight, the metadata including information related to a lineage of the data used for generating the insight;
identifying the analytics function used for generating the insight from the earlier data based on the metadata; and
generating a new insight by applying the analytics function used to generate the insight from the earlier data to the new data;
wherein the lineage of the data defines one or more dependencies between an input file, an output file, and one or more analytics functions applied to the input file, and wherein the analytics function comprises transformation, formatting, conversion, mapping, classification, analysis, summarization, or clustering.

2. The method of claim 1, further comprising presenting the analytics function used for generating the insight from the earlier data.

3. The method of claim 1, further comprising recommending the analytics function used for generating the insight from the earlier data to generate a corresponding insight from the new data.

4. The method of claim 1, further comprising presenting the insight generated from the earlier data.

5. A system for associating an insight with data, comprising:
processing circuitry; and
a memory including instructions that, when executed by the processing circuitry, cause the system to:
receive new data from a data source;
determine that a data type of the new data is same as compared to an existing data;
identify an insight generated from the existing data, wherein the insight represents intermediate or resultant data generated upon processing of the existing data by an analytics function, wherein metadata generated for and associated with the insight is used to identify the insight, the metadata including information related to a lineage of the data used for generating the insight; and
identify an analytics function used to generate the insight from the existing data based on the metadata;
recommend usage of the analytics function used to generate the insight based on the existing data to generate a corresponding insight from the new data; and
use the analytics function to generate a corresponding insight from the new data,
wherein the analytics function comprises transformation, formatting, conversion, mapping, classification, analysis, summarization, or clustering.

6. The system of claim 5, wherein the instructions further cause the system is to recommend the insight generated from the existing data.

7. The system of claim 6, wherein the instructions further cause the system to recommend the insight based on a rank assigned to the insight.

8. The system of claim 5, wherein the existing data is from the data source.

9. The system of claim 5, wherein the existing data is from another data source.

10. A non-transitory machine-readable storage medium comprising instructions for associating an insight with data, the instructions executable by a processor to:
Receive new data from a data source;
determine that data type of the new data is same as compared to an earlier data; and
identify an insight generated from the earlier data, wherein the insight represents intermediate or resultant data generated upon processing of the earlier data by an analytics function, wherein metadata generated for and associated with the insight is used to identify the insight, the metadata including information related to a lineage of the data used for generating the insight; and
identify the analytics function used to generate the insight from the earlier data based on the metadata; and
generating a new insight by applying the analytics function used to generate the insight from the earlier data to the new data,
wherein the analytics function comprises transformation, formatting, conversion, mapping, classification, analysis, summarization, or clustering.

11. The storage medium of claim 10, wherein the instructions to determine that data type of the new data is same as compared to the earlier data includes comparing a structure of the new data with a structure of the earlier data.

12. The storage medium of claim 10, wherein the instructions to determine that data type of the new data is same as compared to the earlier data includes comparing a schema of the new data with a schema of the earlier data.

13. The storage medium of claim 10, wherein the instructions to determine that data type of the new data is same as compared to the earlier data includes instructions to:
determine that data type of the new data is same as compared to a portion of the earlier data; and
identify the portion of the earlier data.

14. The storage medium of claim 13, further comprising instructions to:
identify an insight generated from the portion of the earlier data; and
generate a new insight corresponding to the insight generated from the portion of the earlier data, from the new data.

* * * * *